United States Patent
Blumenstock

(10) Patent No.: US 6,289,721 B1
(45) Date of Patent: Sep. 18, 2001

(54) METHOD FOR DETECTING A TANKING OPERATION ON A RECEPTACLE

(75) Inventor: Andreas Blumenstock, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 490 days.

(21) Appl. No.: 08/722,682

(22) Filed: Sep. 30, 1996

(30) Foreign Application Priority Data

Sep. 30, 1995 (DE) .............................................. 195 36 646

(51) Int. Cl.⁷ .................................................... F02M 33/02
(52) U.S. Cl. ................................................................ 73/40
(58) Field of Search ....................................... 73/40

(56) References Cited

U.S. PATENT DOCUMENTS

| | | |
|---|---|---|
| 2,391,040 | 12/1945 | Scully . |
| 4,802,516 | 2/1989 | Dahlem ................................. 141/392 |
| 5,118,074 | 6/1992 | Weissman ............................... 251/90 |

FOREIGN PATENT DOCUMENTS 4003751   8/1991  (DE) .

*Primary Examiner*—Eric S. McCall
(74) *Attorney, Agent, or Firm*—Walter Ottesen

(57) ABSTRACT

The invention is directed to a method for detecting a filling or tanking operation on a receptacle. The pressure is measured to obtain a trace of pressure as a function of time which is characteristic for a tanking operation. A conclusion that a tanking operation is present is made from the trace.

9 Claims, 3 Drawing Sheets

METHOD FOR DETECTING A TANKING OPERATION ON A RECEPTACLE

BACKGROUND OF THE INVENTION

Tanking operations must be reliably detected in various areas of technology. For example, in the chemical industry or in processing technology, it is of significance to detect tanking operations. Furthermore, it is advantageous in the area of motor vehicles to detect tanking operations. The detection of a tanking operation is of significance especially together with a test of the tightness of a tank-venting system.

Starting with the year 1996, the California Environmental Authority (CARB) requires an on-board diagnosis to check the operability of the tank-venting system in motor vehicles. In this connection, especially a test as to tightness of the tank-venting system should be performed.

A tank-venting system for a motor vehicle generally includes a fuel tank and a tank-venting valve which is connected to the intake pipe of an internal combustion engine so that, with the aid of underpressure in the intake pipe, fuel vapors can be drawn off by suction. Usually, the volume in the tank located above the fuel is drawn off via an adsorption filter mounted between the tank and the tank-venting valve. The adsorption filter in most cases is an active charcoal filter. This active charcoal filter adsorbs fuel in those time spans in which no suction from the intake pipe takes place, for example, when the engine is at standstill or when the tank-venting valve is held in the closed position because of the actual operating state.

U.S. Pat. No. 5,193,512 discloses a tank-venting system for a motor vehicle with a fuel tank. The tank-venting system includes an adsorption filter, which is connected to the fuel tank via a filter line, and which has a venting line. The tank-venting system also includes a tank-venting valve which connects the adsorption filter to the intake pipe of the engine via a valve line. A controllable shutoff valve is mounted in the venting line of the adsorption filter. In this way, the venting line of the adsorption filter can be blocked in a controlled manner.

The above makes it possible to carry out a method for checking the operability of the system in that the venting line of the adsorption filter of the system is shut off and the tank-venting valve of the system is opened. A measurement is made as to whether an underpressure has developed in the tank and, if this is the case, a conclusion can be drawn as to the operability of the system.

This method permits the tightness of the tank-venting system to be checked essentially by measuring the pressure difference between the pressure present in the tank and the ambient pressure. The system is viewed as being tight when an underpressure in the tank-venting system is maintained over a certain pregiven time span. However, if it is determined that the underpressure does not even build up or drops very rapidly, then a conclusion is drawn that a leak is present in the tank-venting system. A fault announcement to the driver of the motor vehicle is outputted and this fault announcement is stored in a memory. The check of the operability of the tank-venting system takes place with this method during idle and when the vehicle is at standstill.

The method for checking the operability of the tank-venting system functions satisfactorily during a proper operation of the vehicle.

However, it can happen that the vehicle is tanked in an impermissible manner with the engine running, for example, in order not to interrupt the operation of the climate control system in warm countries or not to interrupt the operation of the heating in very cold countries during tanking. If, when tanking the vehicle with the engine not switched off, that is, during idle of the vehicle, a diagnosis to check the operability of the tank-venting system is run through, a leak is diagnosed because of the open tank cap. A "leak" of this kind is, however, not to be attributed to damage to the tank-venting system and instead is attributed to an improper use of the vehicle. There is no interest to diagnose a temporarily occurring "leak" of this kind. Especially, this "leak" should not be stored in the fault memory of the diagnostic system.

For the above reason, a basic problem exists to detect tanking operations for motor vehicles and especially to store the above-mentioned fault announcements only when the tank is closed.

U.S. Pat. No. 5,193,511 discloses a tank cap switch utilized for control purposes. The switch opens when the tank is open and is closed when the tank is closed. A tank cap switch of this kind can be used for detecting tanking operations in vehicles. This, however, has the disadvantage that even this kind of tank cap switch must be checked with respect to operability as set forth in the requirements of the California Environmental Authority (CARB). Furthermore, a tank cap switch of this kind introduces additional costs and a leakage diagnosis would be continuously suppressed when, for example, it is neglected to close the tank.

SUMMARY OF THE INVENTION

It is an object of the invention to provide a method for detecting tanking operations on vessels which eliminates the above-mentioned disadvantages. It is especially an object of the invention to provide a method for detecting tanking operations for vehicles having a diagnostic system for checking the operability of the tank-venting system.

The method of the invention is for detecting a filling or tanking operation on a receptacle. The method includes the steps of: measuring pressure to obtain a trace of pressure as a function of time which is characteristic for a tanking operation; and, concluding that a tanking operation is present from the trace.

It is especially advantageous to draw a conclusion as to a tanking operation based on a pressure trace characterizing a tanking operation. In this way, only a pressure measurement is necessary in order to draw the conclusion as to a tanking operation. Such a pressure measurement can be performed with conventional pressure sensors in an especially cost-effective and simple manner.

It is, for example, advantageous that the measurements to provide the pressure trace are made in the vessel within a pregiven time interval. In this way, it is possible to detect a tanking operation which extends over a certain time span with the following sequence: opening of the tank cover of the vessel, introducing the fill nozzle, tanking, removing the fill nozzle and closing the vessel. A fault announcement is avoided immediately after opening the cap of the vessel and in advance of introducing the fill nozzle.

It has been shown that a slight overpressure compared to the ambient occurs in the vessel during a tanking operation. This overpressure is caused by the in-flowing volume. For this reason, it is preferable to draw a conclusion as to a tanking operation when measuring such an overpressure, which builds up in the vessel relative to the ambient pressure.

The method can be especially advantageously used for fuel tanks of a vehicle.

Vehicles can be equipped with a diagnostic system for checking the operability of a tank-venting system. In such vehicles, a simple pressure measurement can be carried out to detect tanking operations especially during the checking of the operability of the tank-venting system via the diagnostic system. And, on the basis of the pressure trace which occurs, a conclusion can be drawn as to a tanking operation. In this way, a conclusion can be drawn as to the tanking operation via a simple pressure measurement. This requires no additional equipment because pressure measurements must always be made to check the operability of the tank-venting system.

The pressure measurement is preferably carried out during the check of the operability of the tank-venting system via the diagnostic system. This is so, because in this way, during the check as to tightness, a temporary leak can be simultaneously detected which is caused by an opened tank cap.

Preferably, the above-mentioned time interval extends over the standstill phase and/or the idle phase of the vehicle in the case of the detection of a tanking operation for a motor vehicle. The reason for this is that the tanking operation has to be completed for a moving vehicle or a vehicle wherein the accelerator pedal is actuated.

Furthermore, it advantageous that, when detecting a tanking operation, a fault announcement of the diagnostic system is suppressed with this fault announcement indicating a leak in the tank-venting system. In this way, the above-mentioned erroneous leak announcements can be avoided which are based on a temporary leak caused by an open tank cap.

Finally, it is especially advantageous that a pressure sensor of the diagnostic system is used to measure the pressure in the tank because, in this way, no further equipment is required for carrying out the method for detecting tanking operations and no further costs are introduced. Furthermore, the method for detecting tanking operations can also be utilized in already existing tank-venting systems by making a retrofit.

BRIEF DESCRIPTION OF THE DRAWINGS

The invention will now be described with reference to the drawings wherein.

DESCRIPTION OF THE PREFERRED EMBODIMENTS OF THE INVENTION

The basic idea of the invention is to conclude that a tanking operation is present from the measurement of a tanking trace, which characterizes a tanking operation. In this way, especially leakage fault announcements, which are caused by an opening of the vessel or tank during tanking, are suppressed. In the case of a tank system of a vehicle, the tank pressure sensor can be used in order to detect the tanking operation and to suppress a fault announcement. The tank pressure sensor is already in place for the leakage diagnosis.

Below, the method of the invention will be described with reference to a tank system of a vehicle having a diagnostic system for checking the operability of a tank-venting system.

The method is however, not limited to the application to a motor vehicle. Instead, the method of the invention is applicable to any type of tanking operation on any desired vessel such as vessels utilized in the chemical industry, processing technology and the like.

Figure 4:
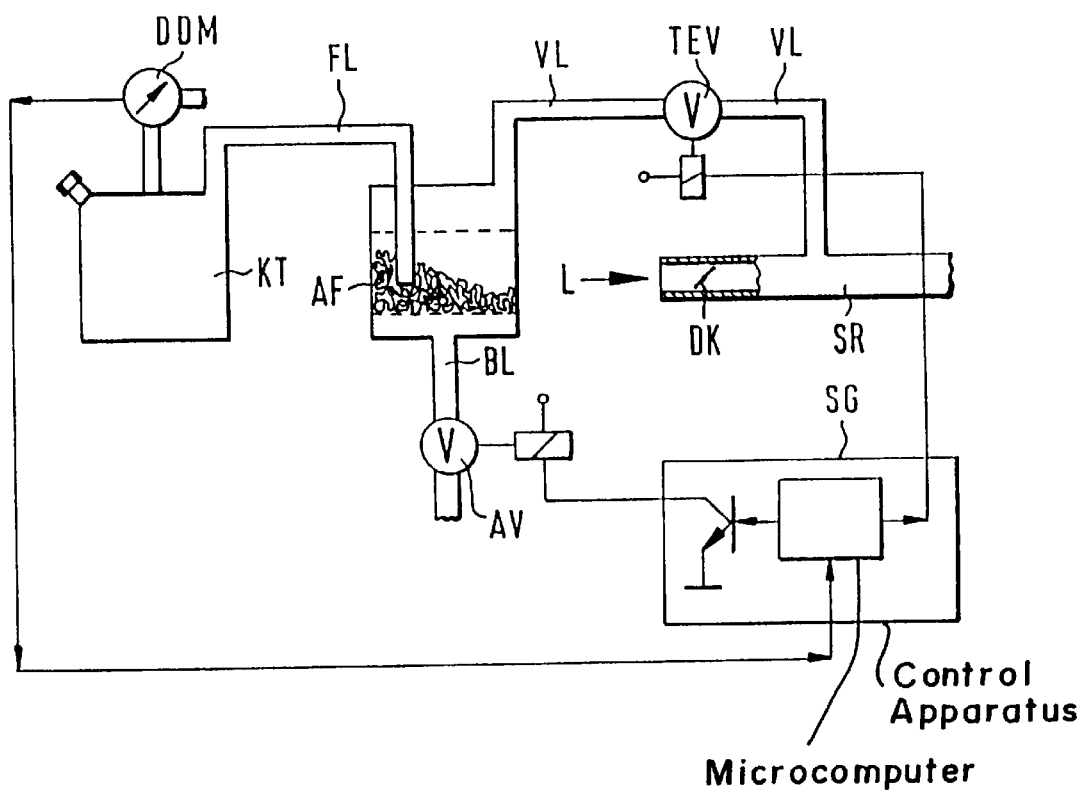

FIG. 4 shows a known tank-venting system which includes fuel tank KT, and adsorption filter AF and a tank-venting valve TEV. The tank-venting valve is mounted in a valve line VL which connects the adsorption filter AF to the intake pipe SR of an internal combustion engine (not shown). The valve line opens into the intake pipe downstream of the throttle flap as viewed in the flow direction L of the inducted air. In this way, it is possible to obtain a relatively high underpressure in the valve line in order to effectively scavenge the adsorption filter AF. The underpressure drops to a few 100 hPa when the throttle flap is substantially closed and the engine is at higher rpms.

The adsorption filter AF is, in turn, connected to the fuel tank KT via a filter line FL. If the fuel vaporizes in the fuel tank, then the vaporous fuel is adsorbed by the active charcoal in the adsorption filter AF. A venting line BL opens into the adsorption filter AF in addition to the above-mentioned filter line FL and the valve line VL. Air flows through this venting line BL when air is drawn by suction through the adsorption filter AF and via the valve line in which the tank-venting valve TEV is mounted. In this way, the active charcoal is regenerated. The active charcoal can again take up fuel in the standstill phases of the engine or in operating phases wherein the tank-venting valve is closed.

The tank-venting system shown in FIG. 4 includes an assembly which can be checked very reliably with respect to operability. This assembly includes components which will be described hereinafter. These additional components include a difference pressure sensor DDM, which measures the difference pressure in the tank compared to atmospheric pressure, and a shutoff valve to controllably cut off the venting line BL. The shutoff valve AV can be opened and closed with the aid of a signal which is outputted by a control apparatus SG.

It has been shown that, when tanking a vehicle, a slight overpressure relative to the ambient pressure occurs. This is caused by the in-flowing volume of fuel which first, via a slight compression, outwardly displaces the vapor volume located in the tank KT via the tank stub or the adsorption filter AF.

Figure 2:
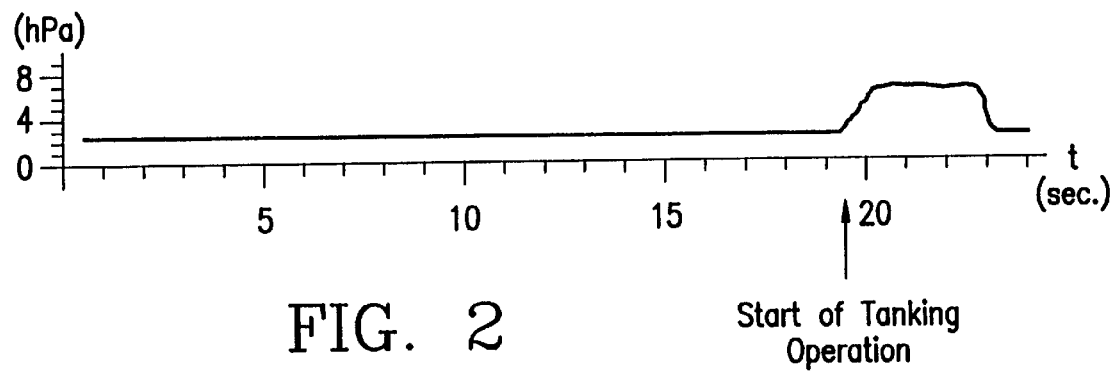
FIGS. 2 and 3 each show characteristic pressure traces during tanking of two different motor vehicles; and, FIG. 4 is a schematic of a tank-venting system of a motor vehicle wherein the method of the invention is applied.
Figure 3:
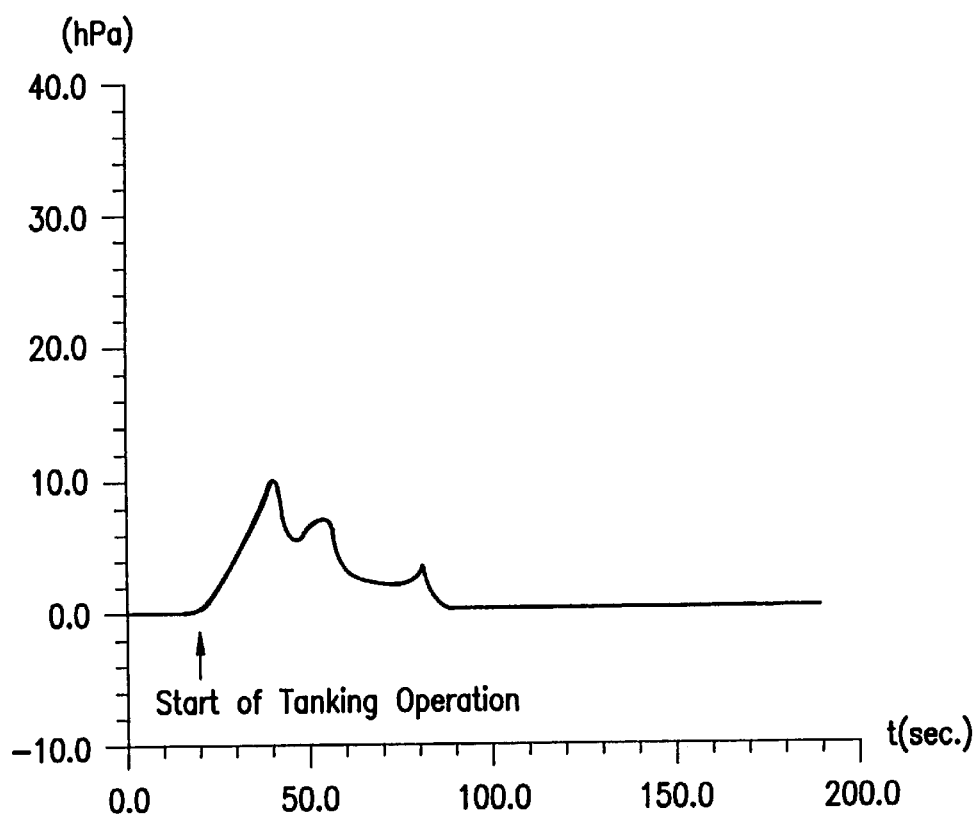

In FIGS. 2 and 3, respective characteristic pressure traces are shown plotted against time. These pressure traces were recorded during tanking of two different vehicles. Here, it is noted that the pressure in the tank at the start of the tanking operation increases significantly and drops again to its original level after the tanking operation. Such a characteristic pressure trace which occurs in all vehicles can be used to detect tanking operations via pressure measurement in the tank and especially during the check of operability of a tank-venting system via a diagnostic system. The measurement of the pressure trace during a tanking operation is made within a pregiven time interval. In this way, the situation is avoided, on the one hand, that for an open tank cap wherein tanking has not yet started, a fault announcement is immediately outputted by the diagnostic system while, on the other hand, a conclusion can be reliably drawn as to a tanking operation based on the time-dependent development of the characteristic pressure trace.

Figure 1:
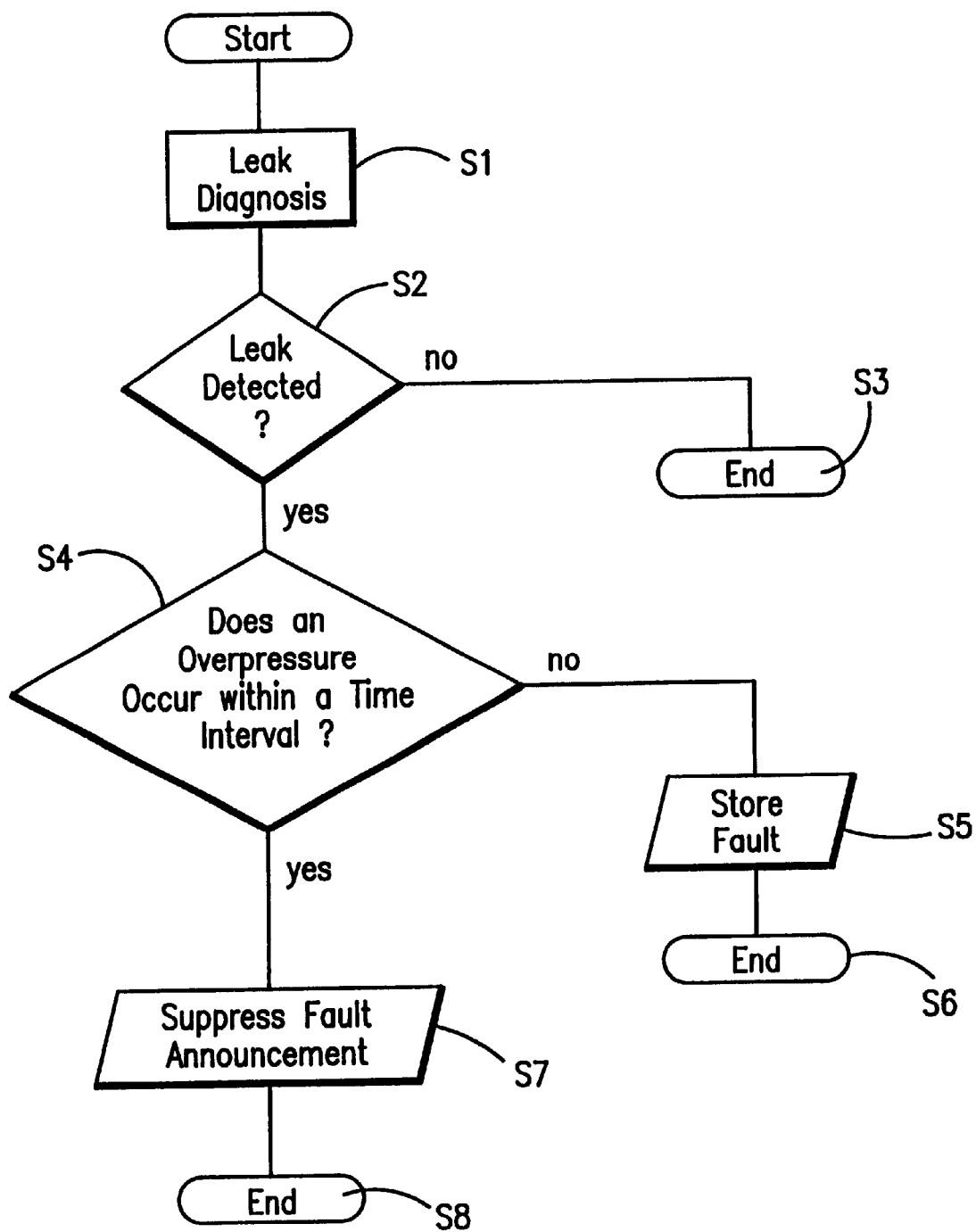
FIG. 1 is a schematic flowchart for explaining the method of the invention for detecting tanking operations in motor vehicles and for suppressing erroneous fault announcements when the tanking operation is detected.

The time interval for measuring the pressure trace extends over the standstill and/or idle phase of the vehicle because tanking has to be completed for a moving vehicle or a vehicle wherein the accelerator pedal is actuated. The method steps of FIG. 1 are executed in order to suppress a fault announcement of the diagnostic system which indicates a leak in the tank-venting system when detecting a tanking operation. In step S1, a leak diagnosis is started as disclosed, for example, in U.S. Pat. No. 5,193,512, incorporated herein by reference. If no leak is discovered in step S2, then the leak diagnosis is completed at step S3.

However, if a leak is discovered, then a check is made in step S4 as to whether, within a pregiven time interval (which extends over standstill and/or the idle phase of the vehicle as discussed above), a characteristic overpressure develops which allows a conclusion to be drawn as to a tanking operation. If this is not the case, then, in step S5, a fault announcement of the diagnostic system, which indicates a leak in the tank-venting system, is outputted and stored. In step S6, the leakage diagnosis is ended.

However, if a characteristic overpressure builds up which would permit a conclusion as to the presence of a tanking operation, then, in step S7, a fault announcement of this kind is suppressed and the leak diagnosis is ended in step S8.

It is especially advantageous that the leak diagnosis as well as the detection of the tanking operation can be undertaken with the aid of a single tank pressure sensor. The single tank pressure sensor is utilized in the known diagnostic system for checking the operability of the tank-venting system.

It is understood that the foregoing description is that of the preferred embodiments of the invention and that various changes and modifications may be made thereto without departing from the spirit and scope of the invention as defined in the appended claims.

What is claimed is:

1. A method for detecting a filling or tanking operation on a receptacle having a receptacle cover, the filling or tanking operation including: opening the receptacle, introducing a fill nozzle, tanking, removing the fill nozzle and closing the receptacle, the method comprising the steps of:

measuring pressure with respect to said receptacle to obtain a trace of pressure as a function of time which is characteristic for a tanking operation; and, concluding that a tanking operation is present from said trace.

2. The method of claim 1, wherein said pressure is measured within a pregiven time interval.

3. The method of claim 1, wherein a conclusion is drawn as to the pressure of said tanking operation when an overpressure builds up in said receptacle relative to ambient pressure.

4. The method of claim 1, wherein said receptacle is a fuel tank of a motor vehicle.

5. A method for detecting a tanking operation on a fuel tank of a motor vehicle having a diagnostic system for checking the operability of a tank-venting system, the tanking operation including: opening the tank, introducing a fill nozzle, tanking, removing the fill nozzle and closing the tank, the method comprising the steps of:

measuring pressure with respect to said tank to obtain a trace of pressure as a function of time; and, concluding that a tanking operation is present from said trace.

6. The method of claim 5, wherein said step of measuring pressure is carried out while checking the operability of said tank-venting system via said diagnostic system.

7. The method of claim 6, wherein the motor vehicle can be at standstill and have idle phases; said pressure is measured within a pregiven time interval; and, said time interval extends over at least one of the standstill and idle phases of said motor vehicle.

8. The method of claim 7, comprising the further step of suppressing a fault announcement of said diagnostic system when said tanking operation is detected; and, said fault announcement indicating a leak in said tank-venting system.

9. The method of claim 5, wherein a difference pressure sensor of said diagnostic system is used to measure the pressure in said fuel tank.

* * * * *